United States Patent
Miyajima

(10) Patent No.: US 10,663,385 B2
(45) Date of Patent: May 26, 2020

(54) MEASUREMENT APPARATUS, TEST METHOD, AND PHYSICAL PROPERTY EVALUATION PROGRAM FOR INDENTATION CREEP TEST, AND RECORDING MEDIUM RECORDING PHYSICAL PROPERTY EVALUATION PROGRAM

(71) Applicant: NATIONAL INSTITUTE OF ADVANCED INDUSTRIAL SCIENCE AND TECHNOLOGY, Tokyo (JP)

(72) Inventor: Tatsuya Miyajima, Aichi (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 149 days.

(21) Appl. No.: 15/577,602

(22) PCT Filed: Jun. 1, 2016

(86) PCT No.: PCT/JP2016/066309
§ 371 (c)(1),
(2) Date: Nov. 28, 2017

(87) PCT Pub. No.: WO2016/194985
PCT Pub. Date: Dec. 8, 2016

(65) Prior Publication Data
US 2018/0164199 A1   Jun. 14, 2018

(30) Foreign Application Priority Data

Jun. 2, 2015 (JP) .................................. 2015-111925
Jan. 29, 2016 (JP) .................................. 2016-016555

(51) Int. Cl.
*G01N 3/42* (2006.01)
*G01N 3/54* (2006.01)

(52) U.S. Cl.
CPC ................. *G01N 3/42* (2013.01); *G01N 3/54* (2013.01); *G01N 2203/0071* (2013.01);
(Continued)

(58) Field of Classification Search
CPC .... G01N 3/42; G01N 3/54; G01N 2203/0071; G01N 2203/0075; G01N 2203/0078;
(Continued)

(56) References Cited

U.S. PATENT DOCUMENTS 4,848,141 A * 7/1989 Oliver .................... G01N 3/405
73/81
6,311,135 B1 * 10/2001 Suresh ..................... G01N 3/42
702/42

(Continued)

FOREIGN PATENT DOCUMENTS

| JP | 2000-214058 | 8/2000 |
| JP | 2005-195357 | 7/2005 |

(Continued)

OTHER PUBLICATIONS

International Search Report dated Jul. 12, 2016 in International Application No. PCT/JP2016/066309.
(Continued)

*Primary Examiner* — Suman K Nath
(74) *Attorney, Agent, or Firm* — Wenderoth, Lind & Ponack, L.L.P.

(57) ABSTRACT

A measurement apparatus for carrying out an indentation creep test on a specimen, including a measurement control apparatus that includes a load measurement device, a constant-load compression device configured to compress a tip of a transparent indenter to a surface of the specimen, and an (Continued)

image capturing device configured to optically capture an image including a contact area portion which is a part of the specimen to which the load is applied by the constant-load compression device. The apparatus also includes an information processing apparatus that includes an image analysis unit configured to analyze a contact area, and a physical property value calculation unit. The physical property value calculation unit conducts linear regression with respect to a plot of a logarithmic value of the contact stress and a logarithmic value of the contact strain rate so as to determine a creep index n and creep constant k.

3 Claims, 15 Drawing Sheets

(52) U.S. Cl.
CPC ............... *G01N 2203/0075* (2013.01); *G01N 2203/0078* (2013.01); *G01N 2203/0094* (2013.01); *G01N 2203/0218* (2013.01); *G01N 2203/0286* (2013.01)

(58) Field of Classification Search
CPC ... G01N 2203/0094; G01N 2203/0218; G01N 2203/0286
USPC ............................................ 73/81, 760, 795
See application file for complete search history.

(56) References Cited

U.S. PATENT DOCUMENTS

| 6,904,806 B2* | 6/2005 | Pryor | G01N 3/48 |
| | | | 73/597 |
| 2013/0018623 A1* | 1/2013 | Sokolov | G01N 3/32 |
| | | | 702/113 |

FOREIGN PATENT DOCUMENTS

| JP | 2007-85778 | 4/2007 |
| JP | 3182252 | 3/2013 |
| JP | 2015-175666 | 10/2015 |

OTHER PUBLICATIONS

Hidenari Takagi, MingDao, Masami Fujiwara, and Masahisa Otsuka, "Detecting the Transition of Creep Rate—Controlling Process in Al—Mg Solid-Solution Alloy through Instrumented Indentation", Journal of Japan Inst. Metals, vol. 69,No. 4, pp. 348-355 (2005), with English abstract.

Norio Hakiri, Mototsugu Sakai, and Tatsuya Miyaiima, "Development of Instrumented Indentation Microscope and Its Application to Indentation Contact Mechanics", J. Mater. Res., vol. 56, No. 6, pp. 510-515 (2007), with English abstract.

Mototsugu Sakai, "Viscoelastic Indentation Contact Mechanics Applied to the Rheological Characterization in Micro-Scales", Journal of the Society of Rheology, Japan, vol. 39, No. 1-2, pp. 7-15 (2011), with English abstract.

Mototsugu Sakai, Shun Kawaguchi, and Norio Hakiri, "Contact-area-based FEA study on conical indentation problems for elastoplastic and viscoelastic-plastic bodies", J. Mater. Res., vol. 27, No. 1, pp. 256-265 (2012), with English abstract.

Toshihiro Mita, Masaaki Misumi, and Masafumi Ohkubo, "Characteristics of Stress Index in Norton law", Collection of 54th National Congress ofTheoretical and Applied Mechanics, Japan, vol. 54, p. 87 (2005), with English abstract.

Shinpei Okazaki et al., "Evaluation of creep characteristics for polypropylene by indentation method", The Japan of Mechanical Engineers Soritsu 110 Shunen Kinen 2007 Nendo Nenji Taikai Koen Ronbunshu, vol. 1, Sep. 9, 2007 (Sep. 9, 2007) pp. 83 to 84, with English translation.

Tatsuya Miyajima, Evaluation of viscoelastic properties by microindenter, Jan. 29, 2016, with English translation.

* cited by examiner

MEASUREMENT APPARATUS, TEST METHOD, AND PHYSICAL PROPERTY EVALUATION PROGRAM FOR INDENTATION CREEP TEST, AND RECORDING MEDIUM RECORDING PHYSICAL PROPERTY EVALUATION PROGRAM

TECHNICAL FIELD

The present invention relates to a measurement apparatus, a test method, and a physical property evaluation program to evaluate creep physical property values based on results of an indentation creep test, and relates to a recording medium recording the physical property evaluation program.

BACKGROUND ART

In the related art, it is known that a phenomenon called "creep" occurs in materials such as metals, polymers, and ceramics and that an object applied with a continuous load for long periods of time changes its size over time. Such a situation brings about various problems in a size-conscious industrial product. To prevent such problems, it is important to formulate and understand creep characteristics for each material at the time of designing the industrial product.

To describe a creep phenomenon with a formula, the following means is popularly practiced: that is, to use a definite relationship between increment of strain c and stress per unit time tin a constant creep range. A typical relationship is a power-law relationship between a minimum creep strain rate and stress, which is widely known as "power-law creep", alias "Norton's law", or "Dorn's law" (for example, Patent Literature 1).

[Mathematical Formula 1]

$$\frac{d\varepsilon}{dt} = k\sigma^n \quad (1)$$

Herein, n represents a creep index, and k represents a creep constant, which are creep physical property values in a constant creep range.

As a constant load is applied to a test piece held under a predetermined testing temperature by a conventional testing standard for evaluating creep characteristics, for example, a test method prescribed in JIS-Z2271 (Metallic materials—Uniaxial creep testing in tension—Method of test), one strain rate can be evaluated. Therefore, in order to determine a creep index n and a creep constant k of the power law in Formula 1 based on a plurality of data points in which a strain rate and stress are considered as one set, it is required to conduct a plurality of tests. Herein, test conditions such as testing temperatures and applied stress change in several steps. Furthermore, one test requires several hours at minimum to several months at a maximum so that an immense amount of time and effort is required to complete the whole tests.

There is an indentation creep test method for evaluating creep physical property values easily and quickly (for example, Non-Patent Literature 1, and Patent Literature 2). Contact stress a generated by compressing an indenter on a surface of a test piece is defined by Formula 2 in which constant applied load $P_0$ is divided by a time change $A_c(t)$ of a projected contact area $A_c$ of an indentation.

[Mathematical Formula 2]

$$\sigma = \frac{P_0}{A_c(t)} \quad (2)$$

A contact area $A_c(t)$, the denominator in Formula 2, cannot be measured by a typical indentation apparatus during load application. Therefore, the following method is widely prevalent. That is, an indentation depth h(t) is measured as an alternative to the contact area $A_c(t)$, and the indentation depth h(t) is converted into the contact area $A_c(t)$ by a reduction formula in Formula 3 which is a combination of functions representing a geometrical shape of an indenter and deformation behavior of a surface around an indentation.

[Mathematical Formula 3]

$$A_c(t) = \frac{g}{\gamma(t)^2} \cdot h(t)^2 \quad (3)$$

Herein, g is a constant determined by a shape of an indenter used in a test. For example, a value of g is 24.5 when using a Berkovich indenter having a three-sided pyramidal tip and an inclined face angle β of 24.7 degrees, as illustrated in FIG. 1, and when using a Vickers indenter having a four-sided pyramidal tip and an inclined face angle β of 22.0 degrees. Furthermore, γ(t) is a parameter of surface deformation representing behavior around an indentation on a surface of a test piece, and is defined by Formula 4 as a ratio of the whole indentation depth $h_t$ and a contact indentation depth $h_c$ as illustrated in FIG. 1.

[Mathematical Formula 4]

$$\gamma(t) = \frac{h_t}{h_c} \quad (4)$$

A value of γ(t) being 1 represents that a height around the indentation on the surface of the test piece is the same as the initial height before the test. A value of γ(t) being larger than 1 represents that a sink-in occurs in the surface around the indentation, while a value of γ(t) being smaller than 1 represents that a pile-up occurs in the surface around the indentation, which means that the surface around the indentation is higher than the initial height.

As can be seen from the theoretical formulae in Formula 2, Formula 3, and Formula 4, in order to measure creep stress in a quantitative way with a typical indentation creep testing apparatus, it is required to measure two parameters: a time change h(t) of the indentation depth and a time change γ(t) of the surface deformation around the indentation. However, a typical indentation creep testing apparatus in the related art cannot determine an in-situ quantity of a time change γ(t) of deformation of an indentation surface on a test piece during load application. Therefore, as an alternative to measuring γ(t) for each test, proximity using a theoretical solution (γ=π/2) of a conical indenter with respect to a perfect elastic body has been widely employed.

There is also know a method for optically observing and measuring a projected contact area $A_c(t)$ of an indent generated as a measurement apparatus applies a load on a surface of a specimen (for example, Non-Patent Literature 2, Non-Patent Literature 3, Non-Patent Literature 4, Patent Literature 3, Patent Literature 4, and Patent Literature 5).

CITATION LIST

Patent Literature

Patent Literature 1: JP 2007-85778 A
Patent Literature 2: JP 2000-214058 A
Patent Literature 3: JP 2005-195357 A
Patent Literature 4: JP 2015-175666 A
Patent Literature 5: Utility Model Registration No. 3182252

Non-Patent Literature

Non-Patent Literature 1: Hidenari Takagi, MingDao, Masami Fujiwara, and Masahisa Otsuka, "Detecting the Transition of Creep Rate—Controlling Process in Al—Mg Solid-Solution Alloy through Instrumented Indentation", Journal of Japan Inst. Metals, Vol. 69, No. 4, pp. 348-355 (2005)
Non-Patent Literature 2: Norio Hakiri, Mototsugu Sakai, and Tatsuya Miyajima, "Development of Instrumented Indentation Microscope and Its Application to Indentation Contact Mechanics", J. Mater. Res., Vol. 56, No. 6, pp. 510-515 (2007)
Non-Patent Literature 3: Mototsugu Sakai, "Viscoelastic Indentation Contact Mechanics Applied to the Rheological Characterization in Micro-Scales", Journal of the Society of Rheology, Japan, Vol. 39, No. 1-2, pp. 7-15 (2011)
Non-Patent Literature 4: Mototsugu Sakai, Shun Kawaguchi, and Norio Hakiri, "Contact-area-based FEA study on conical indentation problems for elastoplastic and viscoelastic-plastic bodies", J. Mater. Res., Vol. 27, No. 1, pp. 256-265 (2012)
Non-Patent Literature 5: Toshihiro Mita, Masaaki Misumi, and Masafumi Ohkubo, "Characteristics of Stress Index in Norton's law", Collection of 54$^{th}$ National Congress of Theoretical and Applied Mechanics, Japan, Vol. 54, p. 87 (2005)

SUMMARY OF INVENTION

Technical Problem

A conventional creep test method may require long periods of time, for several months or more, to complete tests. According to a conventional method for analyzing indentation creep, when inducing a relationship between a contact strain rate dε/dt and contact stress a, it is difficult to convert a measured value of an indentation depth into an actual contact area and to calculate the contact stress from an applied load and the contact area, which may lead to difficulty in simultaneous determination of a creep index n and a creep constant k.

The present invention has been made in light of such situations in the related art, and an object of the present invention is to provide a technology to evaluate a creep index n and a creep constant k, which are creep physical property values, simultaneously, easily, and quickly.

Solution to Problem

To solve the above problems, the present invention provides the following technical means and technical method.

[1] A measurement apparatus for carrying out an indentation creep test on a specimen, the measurement apparatus including: an indentation creep testing machine; a measurement control apparatus; and an information processing apparatus,
  wherein the measurement control apparatus includes
  a load measurement device configured to measure a load;
  a constant-load compression device configured to compress a tip of a transparent indenter to a surface of the specimen under a load having a constant load value; and
  an image capturing device configured to optically capture an image including a contact area portion which is a part of the specimen to which the load is applied by the constant-load compression device, and
  the information processing apparatus includes
  an image analysis unit configured to analyze a contact area from the image including the contact area portion captured by the image capturing device; and
  a physical property value calculation unit including a viscoelastic-contact-area calculation unit configured to subtract a plastic contact area to be obtained analytically from the contact area analyzed by the image analysis unit so as to calculate a viscoelastic contact area, a stress calculation unit configured to calculate contact stress based on the viscoelastic contact area calculated by the viscoelastic-contact-area calculation unit and the constant load value, and a strain rate calculation unit configured to calculate a contact strain rate based on the viscoelastic contact area, wherein the physical property value calculation unit is configured to conduct linear regression with respect to a plot of a logarithmic value of the contact stress and a logarithmic value of the contact strain rate so as to determine a creep index n and creep constant k.

[2] A test method for carrying out an indentation creep test on a specimen with a measurement apparatus including an indentation creep testing machine, a measurement control apparatus, and an information processing apparatus, the test method including:
  causing the measurement control apparatus to perform
  a measuring step of measuring a load;
  a constant load compressing step of compressing a tip of a transparent indenter to a surface of the specimen under a load having a constant load value; and
  a capturing step of optically capturing an image including a contact area portion which is a part of the specimen to which the load is applied by the constant-load compression, and
  causing the information processing apparatus to perform
  an image analyzing step of analyzing a contact area from the image including the captured contact area portion;
  a viscoelastic contact area calculating step of subtracting a plastic contact area to be obtained analytically from the contact area so as to calculate a viscoelastic contact area;
  a stress calculating step of calculating contact stress based on the viscoelastic contact area and the constant load value;
  a strain rate calculating step of calculating a contact strain rate based on the viscoelastic contact area; and
  a step of conducting linear regression with respect to a plot of a logarithmic value of the contact stress and a logarithmic value of the contact strain rate so as to determine a creep index n and creep constant k.

[3] A physical property evaluation program for carrying out an indentation creep test on a specimen with a measurement apparatus including an indentation creep testing machine, a measurement control apparatus, and an information processing apparatus, the physical property evaluation program causing a computer to execute the following steps by the measurement control apparatus, the steps including:
  a measuring step of measuring of a load;
  a constant load compressing step of compressing a tip of a transparent indenter to a surface of the specimen under a load having a constant load value; and
  a capturing step of optically capturing an image including a contact area portion which is a part of the specimen to which the load is applied by the constant-load compression, and the physical property evaluation program causing the computer to execute the following steps by the information processing apparatus, the steps including:
  an image analyzing step of analyzing a contact area from the image including the captured contact area portion;
  a viscoelastic contact area calculating step of subtracting a plastic contact area to be obtained analytically from the contact area so as to calculate a viscoelastic contact area;
  a stress calculating step of calculating contact stress based on the viscoelastic contact area and the constant load value;
  a strain rate calculating step of calculating a contact strain rate based on the viscoelastic contact area; and
  a step of conducting linear regression with respect to a plot of a logarithmic value of the contact stress and a logarithmic value of the contact strain rate so as to determine a creep index n and creep constant k.

[4] A computer readable recording medium, the recording medium recording the physical property evaluation program according to the above [3].

The present invention employs a method for continuously measuring a contact area $A_c(t)$ in the middle of a creep test so that there is no need to simultaneously measure two parameters: a time change $h(t)$ of an indentation depth, and a time change $\gamma(t)$ of deformation in an indentation surface of a test piece so as to convert the contact area $A_c(t)$ into stress. Therefore, Formulae 3, and 4 are not required, which leads to severe analysis amenable to theory.

In a case where a sharp-angled indenter having an inclined face angle $\beta$ is compressed under an applied load P on a surface of a specimen of a perfect elastic body, an elastic solution of an elastic contact area $A_e$ is given by the following Formula.

[Mathematical Formula 5]

$$A_e = \frac{2P}{E'\tan\beta} \qquad (5)$$

On the other hand, in a case where a specimen is a viscoelastic body, plasticity induced by high stress generated just beneath the indenter is included in the contact area $A_c$ as a plastic contact area $A_p$.

A contact area is known as having additive property based on compression volume (Non-Patent Literature 4). A relationship between a plastic contact area and an elastic contact area in an elastoplastic body is given by Formula 6.

[Mathematical Formula 6]

$$A_c(t)^{3/2} = A_p^{3/2} + A_e(t)^{3/2} \qquad (6)$$

Similarly, a relationship between a plastic contact area and a viscoelastic contact area in a viscoelastic body is given by Formula 7.

[Mathematical Formula 7]

$$A_c(t)^{3/2} = A_p^{3/2} + A_{ve}(t)^{3/2} \qquad (7)$$

Furthermore, solving Formula 7 in regard to the viscoelastic contact area $A_{ve}(t)$ determines Formula 8.

[Mathematical Formula 8]

$$A_{ve}(t) = [A_c(t)^{3/2} - A_p^{3/2}]^{2/3} \qquad (8)$$

To determine creep physical property values, it is required to analyze the viscoelastic contact area $A_{ve}(t)$ in which the plastic contact area $A_p$ is subtracted from a measured value $A_c(t)$.

There are two methods to analytically obtain the plastic contact area $A_p$. One of the methods uses Young's modulus. Herein, Formula 5 which is the elastic solution is substituted into Formula 6 so as to obtain an area $A_p$ of a plastic component as represented by Formula 9.

[Mathematical Formula 9]

$$A_p = \left[A_c(t)^{3/2} - \left(\frac{2P_0}{E'\tan\beta}\right)^{3/2}\right]^{2/3} \qquad (9)$$

The other method uses a yield value, and the plastic contact area $A_p$ herein is obtained by Formula 10.

[Mathematical Formula 10]

$$A_p = \frac{P_0}{C \cdot Y} \qquad (10)$$

Herein, a coefficient C is a restraint coefficient of a relationship between hardness H and a yield value Y of a perfect plastic body (H=CY), and the coefficient C is a constant ranging from 2.6 to 3.2.

Accordingly, as the plastic contact area $A_p$ estimated by Formula 9 or Formula 10 is substituted into Formula 8, the viscoelastic contact area $A_{ve}(t)$ can be obtained.

A strain rate $d\varepsilon/dt$ to be evaluated in an indentation creep test is represented by the following Formula, using a viscoelastic contact radius $a(t)$ converted from the viscoelastic contact area $A_{ve}(t)$ (to be mentioned in Example).

[Mathematical Formula 11]

$$\frac{d\varepsilon}{dt} = \frac{1}{a}\frac{da(t)}{dt} \qquad (11)$$

Contact stress a to be evaluated in the indentation creep test is given by Formula 2. Therefore, substituting Formulae 2, and 11 into Formula 1 determines Formula 12 which is a constitutive equation of contact stress and viscoelastic contact strain.

[Mathematical Formula 12]

$$\frac{1}{a}\frac{da(t)}{dt} = k\left(\frac{P_0}{A_c(t)}\right)^n \quad (12)$$

Taking logarithms of both sides in Formula 12 determines Formula 13. Herein, the base of the logarithms may be any numerical value. Common logarithms may select 10, and natural logarithms may select e (=2.71828) appropriately.

[Mathematical Formula 13]

$$\ln\left(\frac{1}{a}\frac{da(t)}{dt}\right) = n \times \ln\left(\frac{P_0}{A_c(t)}\right) + \ln(k) \quad (13)$$

Measurement Data of the contact stress $\ln(P_0/A_c(t))$ are plotted on the X-axis, and measurement data of the viscoelastic contact strain $\ln((1/a)(da(t)/dt))$ are plotted on the Y-axis, thereby conducting linear regression with a minimum error of the least squares method and the like. Accordingly, it is possible to simultaneously determine the creep index n from the slope of the regression line, and the creep constant k from the intercept of the regression line.

In other words, creep physical property values are determined by calculation in which a plastic component is removed from a change in a contact area to be measured in an indentation creep test. According to the present invention, it is possible to avoid such a problem seen in a conventional indentation creep test that an indentation depth and a parameter γ(t) of surface deformation representing behavior around an indentation on a surface of a test piece should be measured so as to estimate a contact area and contact stress.

Advantageous Effects of Invention

A method of analysis using a measurement apparatus, a test method, and a physical property evaluation program of the present invention is based on a constant load value $P_0$ and a value of a contact area A directly measured in the middle of an indentation creep test. Therefore, it is possible to easily induce a relationship between stress and strain rate of viscoelasticity only from which an influence of plasticity generated during the test is removed, and it is possible to evaluate a creep index n and a creep constant k, which are creep physical property values, simultaneously, easily, and quickly.

DESCRIPTION OF EMBODIMENTS

Hereinafter, an embodiment of the present invention will be described.

Figure 1:
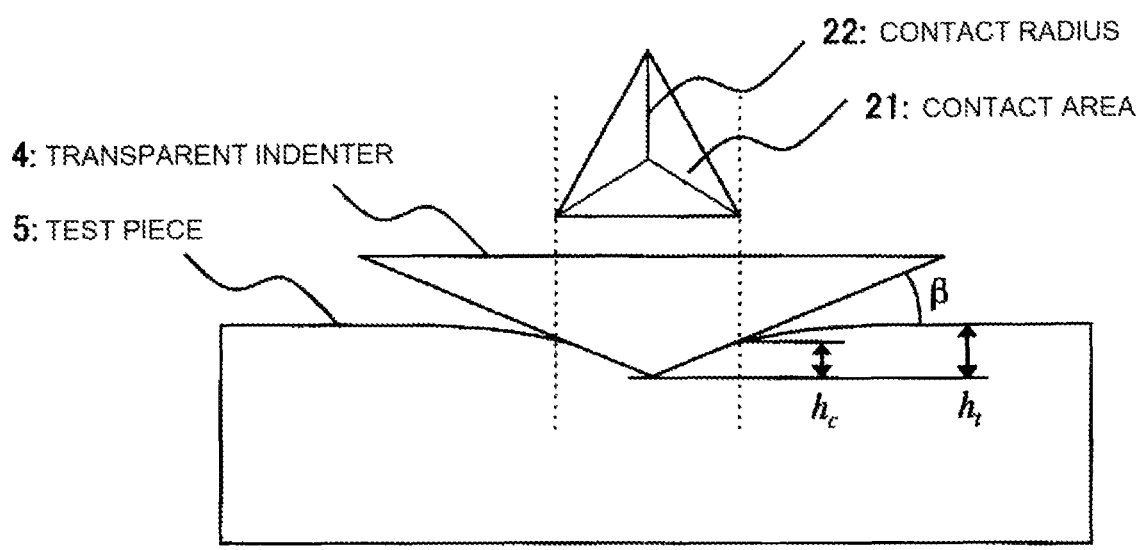
FIG. 1 is a view illustrating an example of a contact area and a contact radius generated by contact between an indenter and a surface of a test piece used in a measurement apparatus to carry out indentation creep evaluation according to an embodiment of the present invention.

FIG. 1 is a view illustrating a contact area and a contact radius generated by contact between an indenter 4 and a surface of a test piece 5 used in a measurement apparatus to carry out indentation creep evaluation according to an embodiment of the present invention. Herein, the indenter 4 is illustrated as a Berkovich indenter having a three-sided pyramidal tip and an inclined face angle β. An indenter includes one protrusion on its tip and has, for example, three-sided pyramid geometry as illustrated in FIG. 1, or four-sided pyramid geometry, or conical geometry. As a characteristic of an indenter, translucency is required so that a contact area can be measured by a video camera (camera) provided outside as light transmits the indenter. A preferred material of such an indenter includes diamond, sapphire, and glass. The indenter employed in the present invention is required to be a transparent indenter. In the drawing, the reference numeral 21 represents a contact area, the reference numeral 22 represents a contact radius, the symbol $h_t$ represents the whole indentation depth, and the symbol $h_c$ represents a contact indentation depth.

Figure 2:
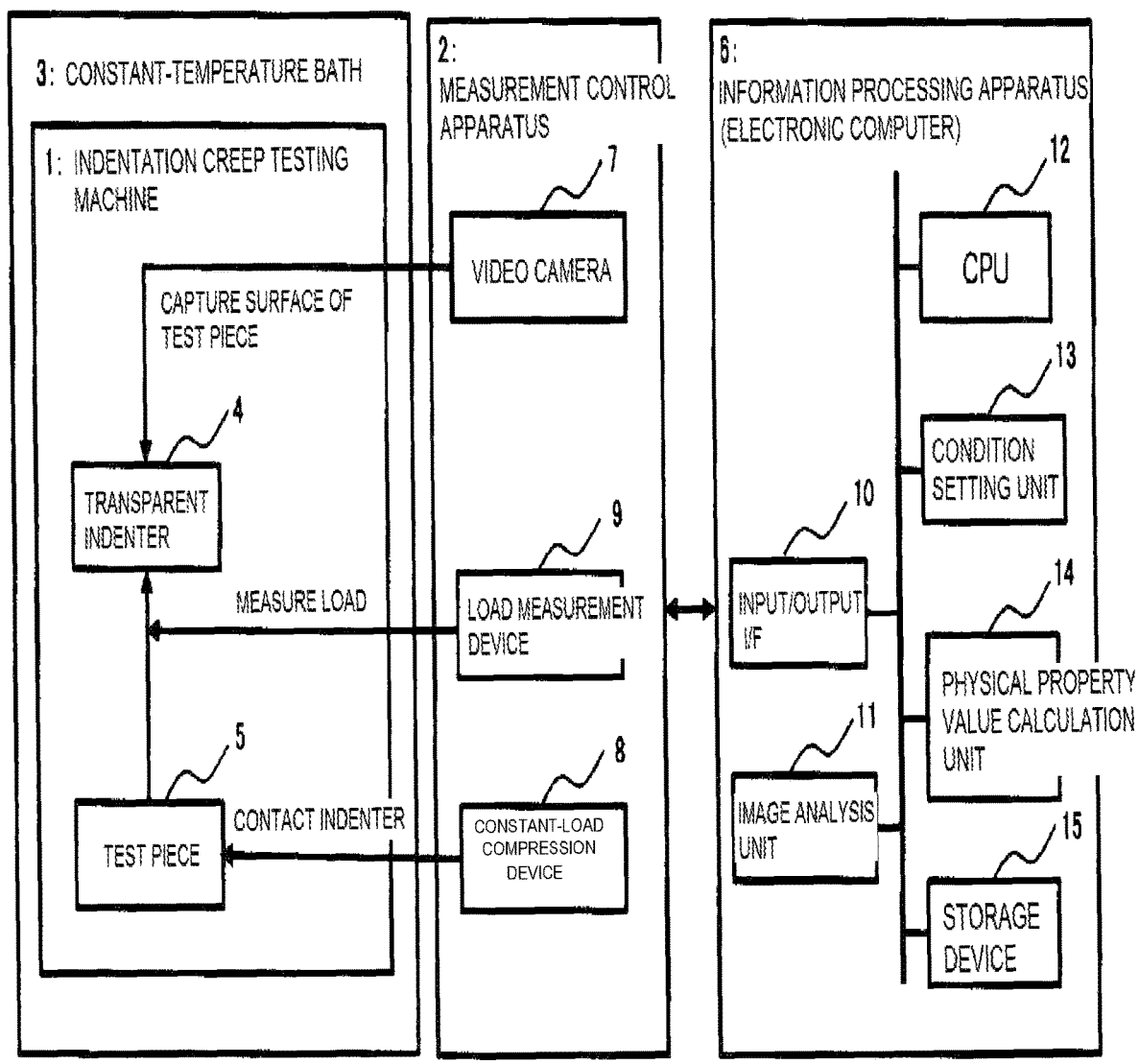
FIG. 2 is a block diagram illustrating an exemplary basic arrangement of the measurement apparatus according to the embodiment of the present invention.

FIG. 2 is a block diagram illustrating an exemplary basic arrangement of the measurement apparatus for carrying out indentation creep evaluation (hereinafter simply referred to as the "measurement apparatus") according to the embodiment of the present invention.

This indentation creep testing apparatus includes an indentation creep testing machine 1, a measurement control apparatus 2, and an information processing apparatus (computer) 6. The indentation creep testing machine 1 is installed inside a constant-temperature bath 3, being configured to bring the transparent indenter 4 (hereinafter also referred to as the "indenter 4") into contact with the surface of the test piece 5 so as to measure creep characteristics of the test piece 5.

The measurement control apparatus 2 includes a video camera 7, a constant-load compression device 8, and a load measurement device 9. The video camera 7 is configured to optically observe a projected contact area $A_c(t)$ of an indent generated by applying a load when the indenter 4 is brought into contact with the surface of the test piece 5. The constant-load compression device 8 is configured to control positioning so that the test piece 5 and the indenter 4 contact each other under a constant load. The load measurement device 9 is configured to measure a load generated by contact between the test piece 5 and the indenter 4.

The information processing apparatus 6 is a computer (electronic computer), including an input/output interface (I/F) 10, a central processing unit (CPU) 12, a condition setting unit 13, a physical property value calculation unit 14, an image analysis unit 11, and a storage device 15. Each element included in the information processing apparatus 6 is connected by a bus.

The image analysis unit 11 of the information processing apparatus 6 uses a dynamic image analysis program stored in the storage device 15. Through the input/output I/F 10, the dynamic image analysis program promotes a user to input settings in regard to selection of an image analysis method, ROI (region of image analysis), and parameters (for example, various analysis conditions of a binarization method), involving the condition setting unit 13. Furthermore, the dynamic image analysis program is developed on a main memory such as a computer memory so as to be executed.

The physical property value calculation unit 14 of the information processing apparatus 6 uses a calculation program stored in the storage device 15. Through the input/output I/F 10, the calculation program promotes the user to input settings in regard to conditions of a creep test such as a temperature of the constant-temperature bath 3, a value of the applied load $P_0$, and a testing time t, involving the condition setting unit 13. Furthermore, the calculation program is developed on a main memory such as a computer memory so as to be executed.

The physical property value calculation unit 14 includes a viscoelastic-contact-area calculation unit, a stress calculation unit, and a strain rate calculation unit. The viscoelastic-contact-area calculation unit is configured to subtract a plastic contact area to be obtained analytically from a contact area analyzed by the image analysis unit 11 so as to calculate a viscoelastic contact area. The stress calculation unit is configured to calculate contact stress based on the viscoelastic contact area calculated by the viscoelastic-contact-area calculation unit and the constant load value. The strain rate calculation unit is configured to calculate a contact strain rate based on the viscoelastic contact area. Furthermore, the physical property value calculation unit 14 is configured to conduct linear regression with respect to a plot of a logarithmic value of the contact stress and a logarithmic value of the contact strain rate so as to determine a creep index n and a creep constant k.

Hereinafter described is a mechanism in which a time change $A_c(t)$ of the contact area of the test piece 5 under the creep test is measured by the indentation creep testing machine 1.

<Arrangement of Indentation Creep Testing Machine>

Figure 3:
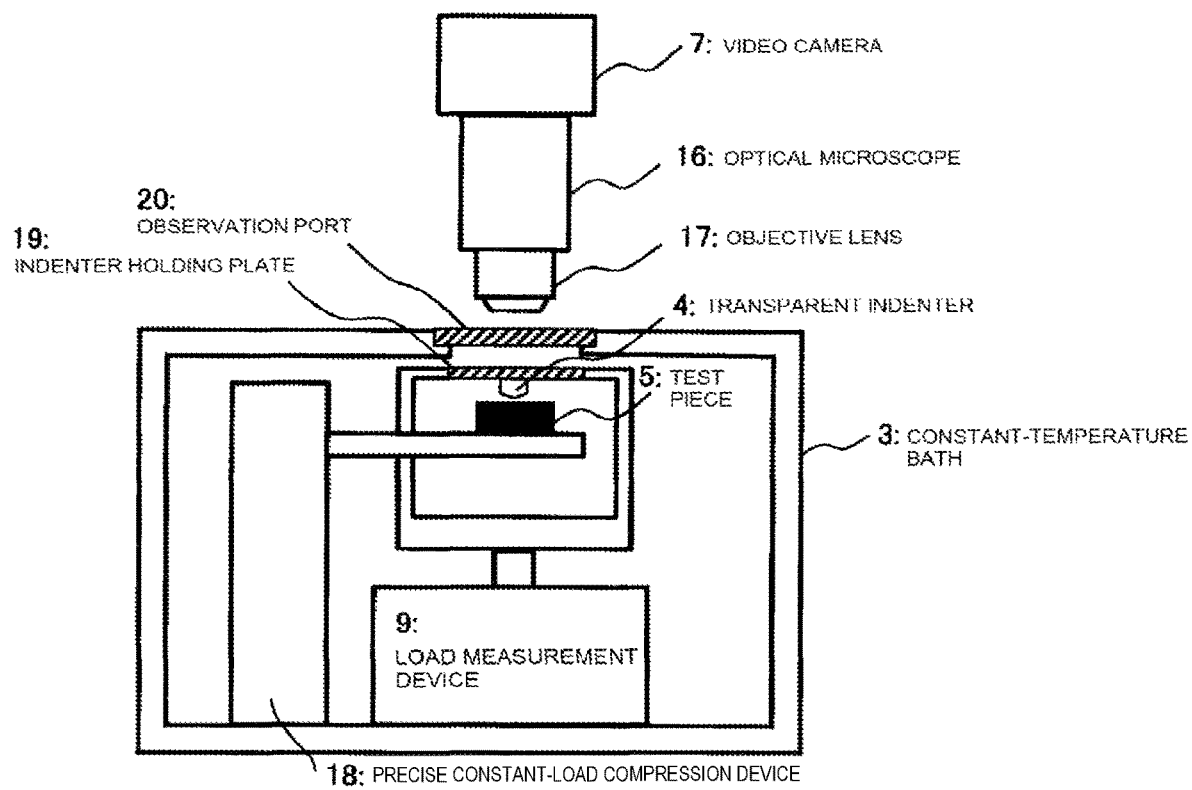
FIG. 3 is a view illustrating an exemplary arrangement of an indentation creep testing machine in the measurement apparatus according to the embodiment of the present invention.

FIG. 3 is a view illustrating an example of a functional arrangement of the indentation creep testing machine in the measurement apparatus according to the embodiment of the present invention. To evaluation a creep physical property, or viscoelasticity, of a specimen, it is required to vary temperatures of the test piece 5 and the transparent indenter 4 to any degree T, and it is also required to dispose the test piece 5 and the transparent indenter 4 inside the constant-temperature bath 3 which can maintain the temperature constant.

A load when the transparent indenter 4 is brought into contact with the surface of the test piece 5 is measured by the load measurement device 9, and is adjusted by a precise constant-load compression device 18 so that the load becomes equivalent to the load $P_0$ set by the condition setting unit 13. Accordingly, the load during the indentation creep test is maintained constant. It should be noted that a method for bringing the transparent indenter 4 into contact with the surface of the test piece 5 under a constant load is not limited to the way described herein, and other method may be appropriately selected. For example, a weight having a certain weight may be used.

To constantly monitor changing aspects of the contact area 21 generated when the transparent indenter 4 is loaded on the surface of the test piece 5 during the creep test, the transparent indenter 4 is fixed to a transparent indenter holding plate 19, and the constant-temperature bath 3 is provided with a transparent observation port 20 so that the changing aspects can be observed from outside the constant-temperature bath 3. To optically augment the changing aspects of the contact area 21, an optical microscope 16 provided with an objective lens 17 is disposed coaxially with an axis connecting the transparent indenter 4 and a contact portion, and the augmented changing aspects are captured by the video camera 7 attached to the optical microscope 16.

The captured images are sent to the image analysis unit 11 of the information processing apparatus 6 so as to be quantified by the dynamic image analysis program. The quantified values of the contact area are written in the storage device 15 as a contact area $A_c(t)$ associated with a test elapsed-time t.

Figure 4:
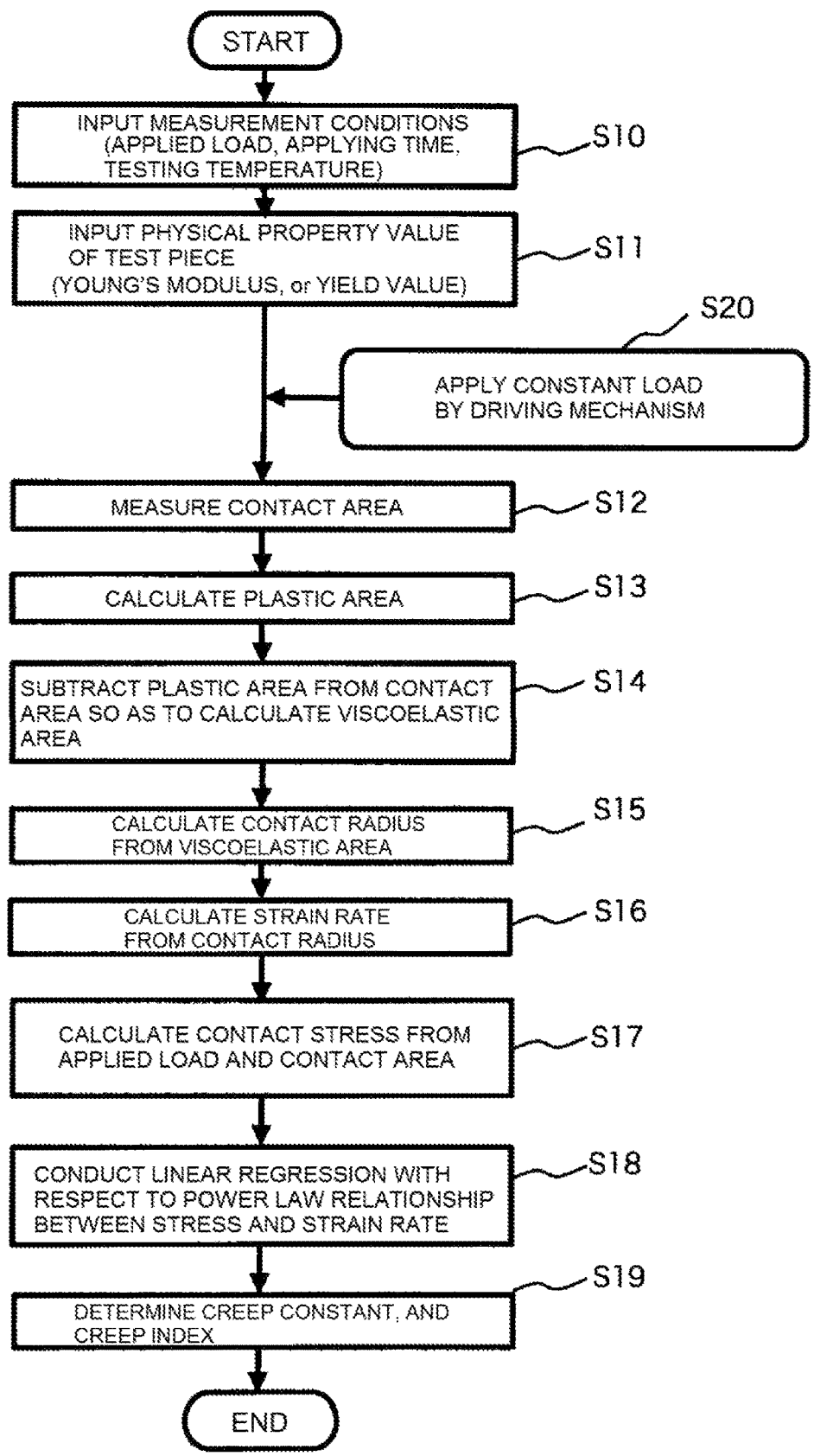
FIG. 4 is an exemplary flowchart of the indentation creep evaluation carried out by the measurement apparatus according to the embodiment of the present invention.

FIG. 4 illustrates an exemplary flowchart of the indentation creep evaluation carried out by the measurement apparatus according to the embodiment of the present invention.

First, in step S10, a value of the applied load $P_0$, a testing time t during which the load is maintained constant, and a temperature T of the constant-temperature bath 3 are input, all of which are conditions of the indentation creep test carried out on the test piece 5, or a to-be-tested object. In step S11, Young's modulus E' or a yield value Y is input, each of which is a physical property value of the specimen. The physical property value of the specimen to be input herein may be one of Young's modulus E' and yield value Y as described above.

Next, in step S20, the indentation creep test is carried out, and the tip of the transparent indenter 4 is compressed on the surface of the test piece under the constant applied load input in the process of condition setting, thereby measuring a contact area $A_c(t)$ in step S12.

In step S13, a plastic component $A_p$ of the contact area $A_c$ is calculated using Formula 9 when the Young's modulus E' is input, or using Formula 10 when the yield value is input. In the next step S14, a viscoelastic contact area $A_{ve}(t)$ of Formula 8 is determined. Then in step S15, the contact area $A_{ve}(t)$ is converted into a contact radius a(t) in accordance with a shape of the tip of the transparent indenter 4 used in the test. In step S16, a strain rate based on the contact radius is calculated according to Formula 11. In step S17, contact stress is calculated according to Formula 2.

In step S18, using Formula 13, linear regression is conducted by the least squares method and the like. Finally, in step S19, a creep index n and a creep constant k, which are the creep physical property values, are determined.

Hereinafter, the present invention will be described in detail with reference to Examples.

Example 1

Figure 5:
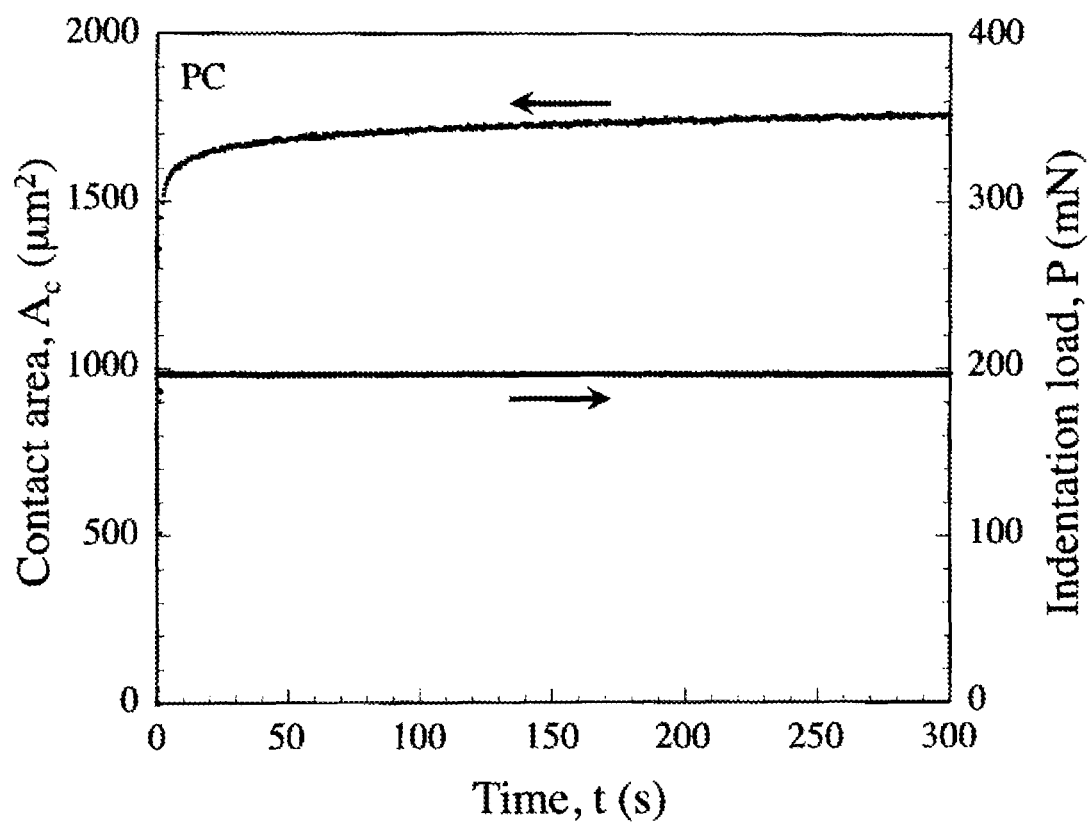
FIG. 5 is a view illustrating exemplary measurement results of an applied load (an indentation load) and a contact area during an indentation creep test of polycarbonate (PC) in an Example of the present invention.

FIG. 5 illustrates actual measured values of an applied load (an indentation load) $P_0$ and a contact area $A_c$ during an indentation creep test carried out by the measurement apparatus according to the embodiment of the present invention in a case where a commercially available plastic plate (polycarbonate (PC)) is used as a specimen. The indentation creep test was carried out with respect to a plate-like test piece (10×10×5 mm) at room temperature (T=21.0° C.), using a diamond Berkovich indenter having a three-sided pyramidal tip and an inclined face angle β of 24.7 degrees. FIG. 5 illustrates a case where a constant applied load ($P_0$=20.000 gf=196.14 mN) is loaded for a predetermined testing time (t=300 seconds), representing a creep curve in which the contact area $A_c$ increases over time. In the following analysis of the power-law creep, viscoelastic analysis was practiced in regard to test data from which data for 10 seconds just after the start of loading was removed. The time to be removed is determined, for example, by a material and a temperature T of a specimen, or an applied load $P_0$, and is not limited to 10 seconds.

Figure 6:
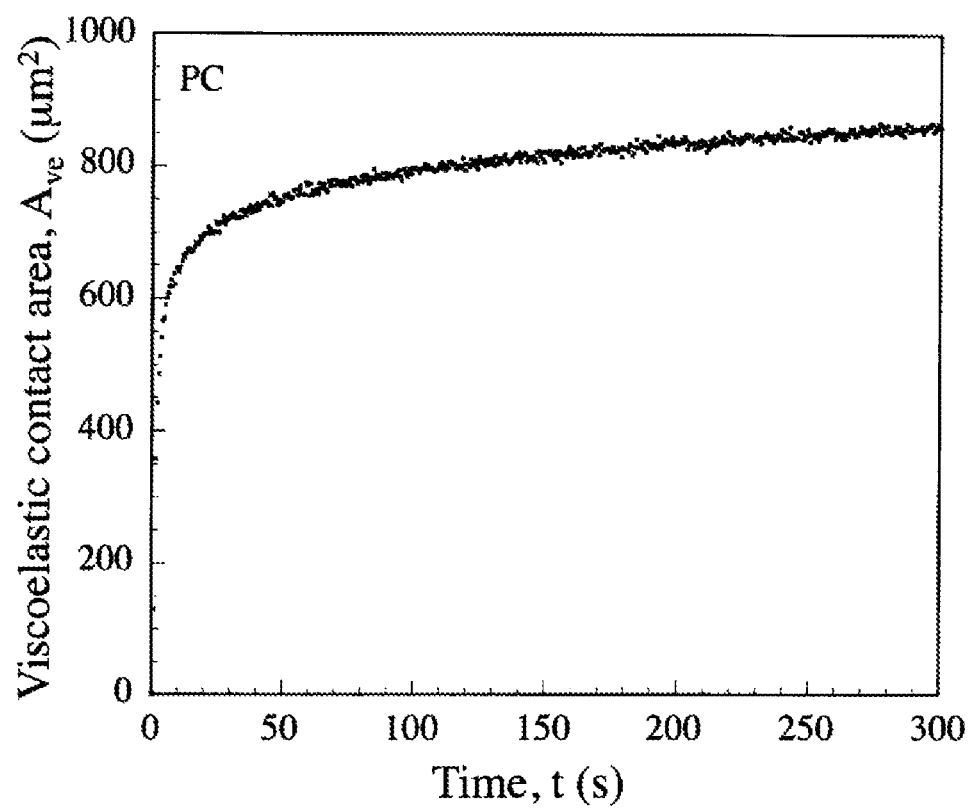
FIG. 6 is a view illustrating an example of a change in the contact area during the indentation creep test of polycarbonate (PC) in the Example of the present invention.

FIG. 6 illustrates a time change of a viscoelastic contact area obtained by removing a plastic contact area during the indentation creep test. Herein, a value of Young's modulus E' of the specimen was 2.35 GPa.

Figure 7:
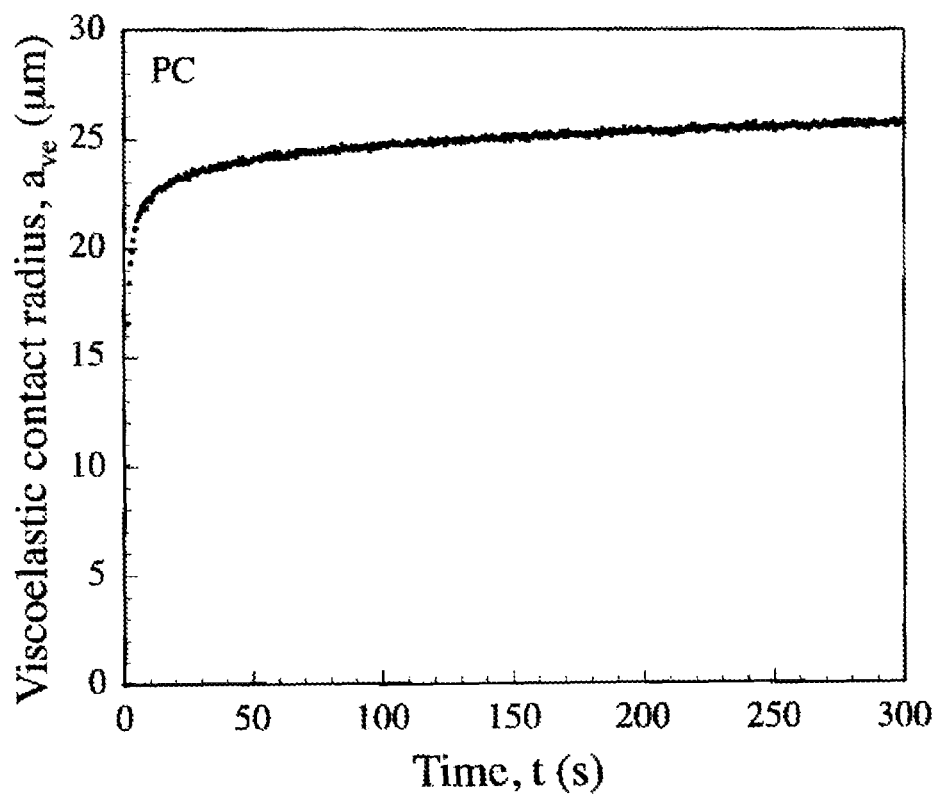
FIG. 7 is a view illustrating an example of a change in a viscoelastic contact radius during the indentation creep test of polycarbonate (PC) in the Example of the present invention.

FIG. 7 illustrates results obtained by converting the time change of the viscoelastic contact area in FIG. 6 into a time change of a viscoelastic contact radius, using a conversion equation with respect to the three-sided pyramidal Berkovich indenter represented by Formula 14.

[Mathematical Formula 14]

$$a_{ve}(t) = \frac{2}{3^{3/4}} \sqrt{A_{ve}(t)} \quad (14)$$

Figure 8:
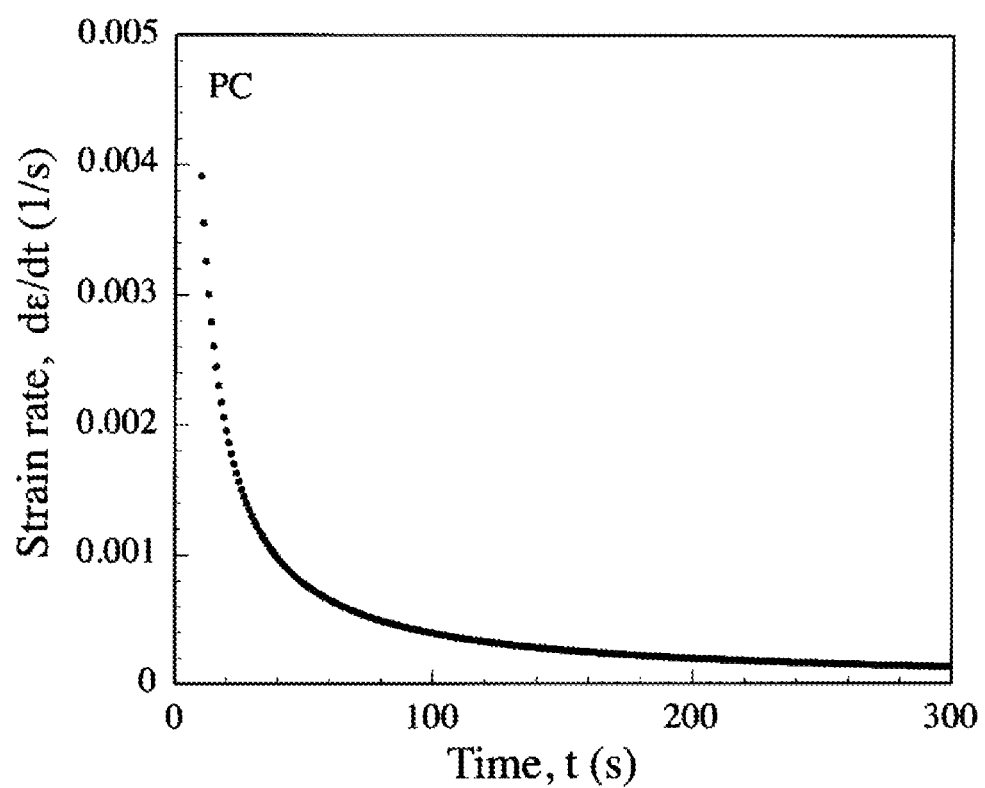
FIG. 8 is a view illustrating an example of a change in a viscoelastic strain rate during the indentation creep test of polycarbonate (PC) in the Example of the present invention.

FIG. 8 illustrates results obtained by calculating a viscoelastic strain rate by Formula 11 based on the results of the time change of the viscoelastic contact radius in FIG. 7.

Figure 9:
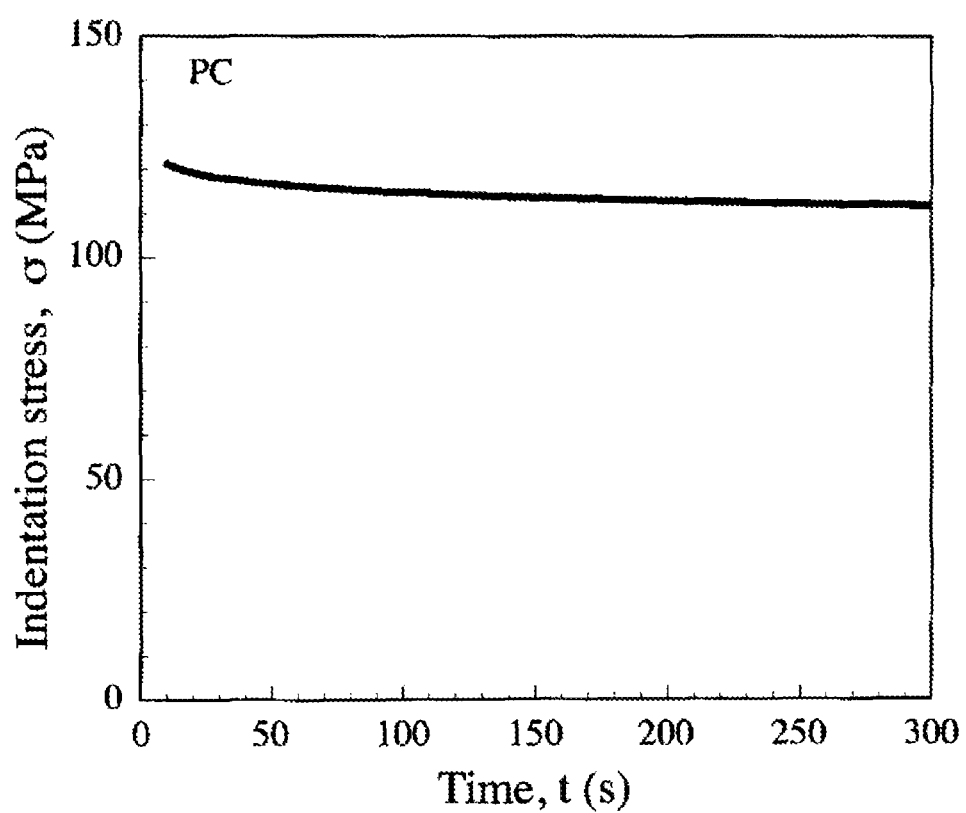
FIG. 9 is a view illustrating an example of a change in contact stress during the indentation creep test of polycarbonate (PC) in the Example of the present invention.

FIG. 9 illustrates results obtained by calculating contact stress by Formula 2 based on the constant applied load $P_0$ and the time change $A_c(t)$ of the contact area in FIG. 5.

Figure 10:
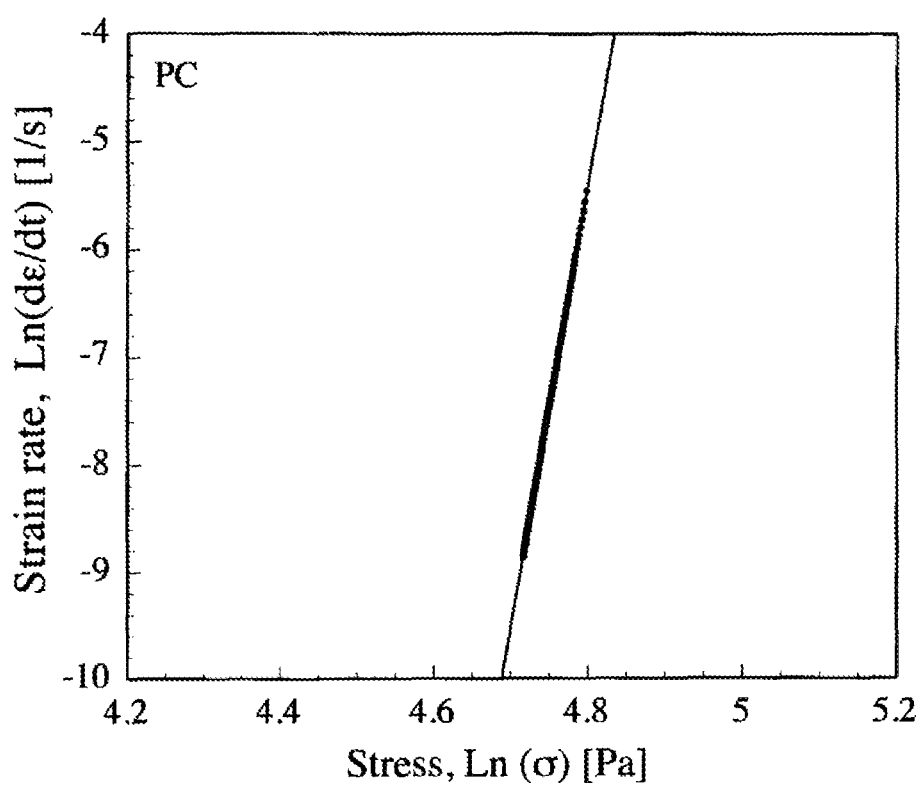
FIG. 10 is a view illustrating a plot of the contact stress and the viscoelastic strain rate of polycarbonate (PC) in the indentation creep test.

FIG. 10 is a graph plotting natural logarithms of the contact stress as the X-axis, and plotting natural logarithms of the viscoelastic strain rate as the Y-axis in accordance with Formula 13, where the base is represented by e. This graph is an example in which MPa is selected as a unit of the contact stress, and $s^{-1}$ is selected as a unit of the viscoelastic strain rate. A linear relationship represented by this plot indicates that the power-law creep represented in Formula 12 or Formula 13 is true even in an indentation creep test method. Linear regression with respect to this linear relationship by the least squares method determines the following Formula 15.

[Mathematical Formula 15]

$$\ln\left(\frac{d\varepsilon}{dt}\right) = 41.47 \times \ln(\sigma) - 204.4 \quad (15)$$

According to Formula 15, a creep index n is determined to be 41.5, and a creep constant k is determined to be $1.68 \times 10^{-89}$.

Although it is not illustrated herein, selecting MPa as a unit of the contact stress, and selecting $h^{-1}$ as a unit of the viscoelastic strain rate determine Formula 16.

[Mathematical Formula 16]

$$\ln\left(\frac{d\varepsilon}{dt}\right) = 41.47 \times \ln(\sigma) - 196.3 \quad (16)$$

In this case, the creep index n is determined to be 41.5, and the creep constant k is determined to be $5.55 \times 10^{-86}$.

Example 2

Figure 11:
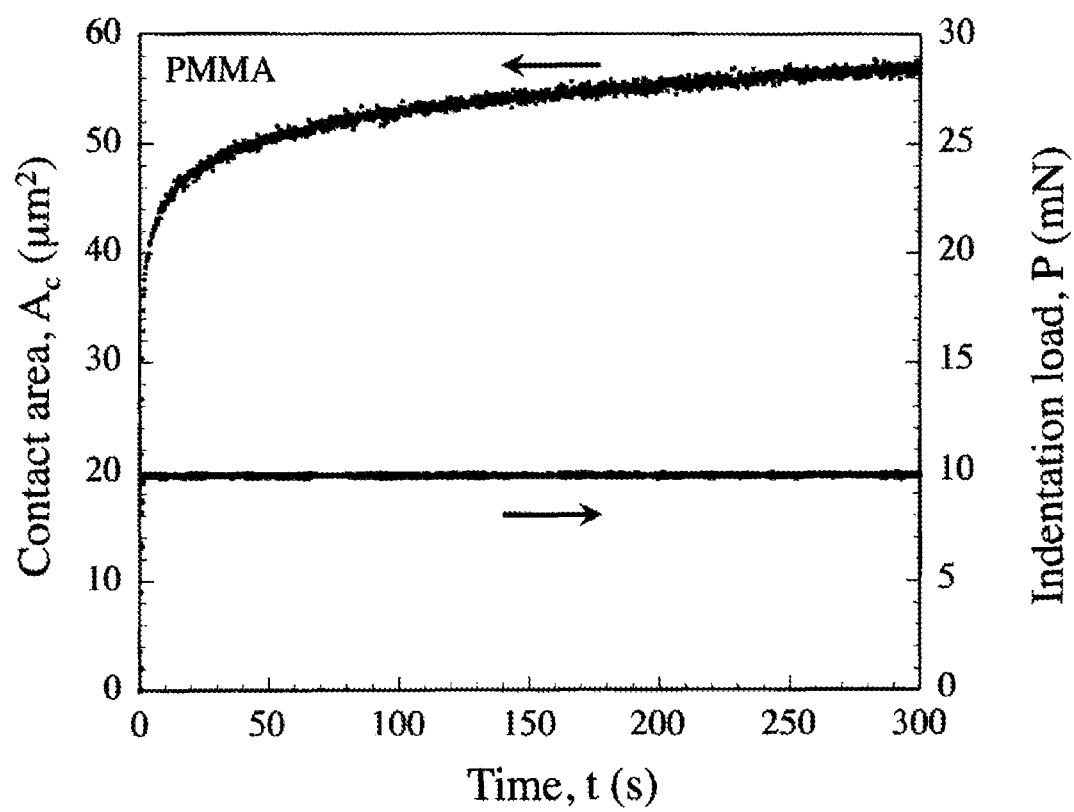
FIG. 11 is a view illustrating exemplary measurement results of an applied load (an indentation load) and a contact area during an indentation creep test of polymethylmethacrylate (PMMA) in another Example of the present invention.

FIG. 11 illustrates actual measured values of an applied load (an indentation load) $P_0$ and a contact area $A_c$ during an indentation creep test carries out by the measurement apparatus according to the embodiment of the present invention in a case where a commercially available synthetic-resin plate (polymethyl methacrylate (PMMA)) is used as a specimen. The indentation creep test was carried out with respect to a plate-like test piece (5×8×1 mm) at room temperature (T=24.0° C.), using a diamond Berkovich indenter having a three-sided pyramidal tip and an inclined face angle β of 25.0 degrees. FIG. 11 illustrates a case where a constant applied load ($P_o$=1.000 gf=9.807 mN) is loaded for a predetermined testing time (t=300 seconds), representing a creep curve in which the contact area $A_c$ increases over time.

Figure 12:
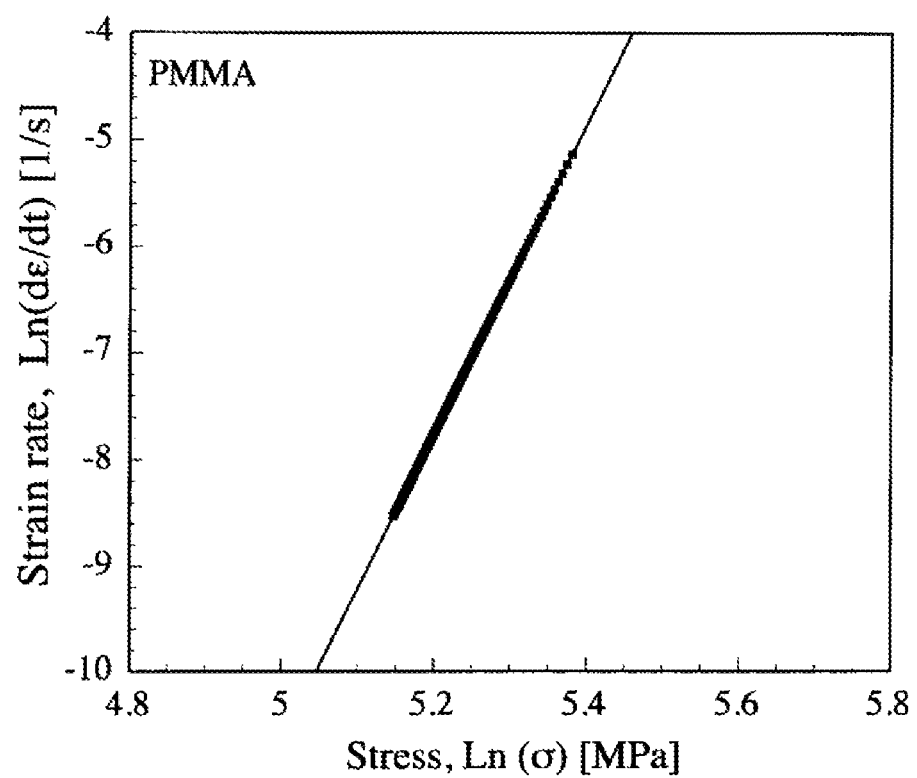
FIG. 12 is a view illustrating a plot of contact stress and a viscoelastic strain rate of polymethylmethacrylate (PMMA) in the indentation creep test.

FIG. 12 is a graph plotting natural logarithms of the contact stress as the X-axis, and plotting natural logarithms of a viscoelastic strain rate as the Y-axis in accordance with Formula 13, where the base is represented by e. This graph is an example in which MPa is selected as a unit of the contact stress, and $s^{-1}$ is selected as a unit of the viscoelastic strain rate. Except that a value of Young's modulus E' used herein is 3.20 GPa, the analysis in this Example is similar to the steps described in the Example using polycarbonate illustrated in FIGS. 6 to 10, so that description of the steps will be omitted.

Linear regression with respect to the linear relationship in FIG. 12 by the least squares method determines the following Formula 17.

[Mathematical Formula 17]

$$\ln\left(\frac{d\varepsilon}{dt}\right) = 14.55 \times \ln(\sigma) - 83.41 \quad (17)$$

According to Formula 17, a creep index n is determined to be 14.6, and a creep constant k is determined to be $5.94 \times 10^{-37}$.

Although it is not illustrated herein, selecting MPa as a unit of the contact stress, and selecting $h^{-1}$ as a unit of the viscoelastic strain rate determine Formula 18.

[Mathematical Formula 18]

$$\ln\left(\frac{d\varepsilon}{dt}\right) = 14.55 \times \ln(\sigma) - 75.23 \quad (18)$$

In this case, the creep index n is determined to be 14.6, and the creep constant k is determined to be $2.14 \times 10^{-33}$.

Example 3

Figure 13:
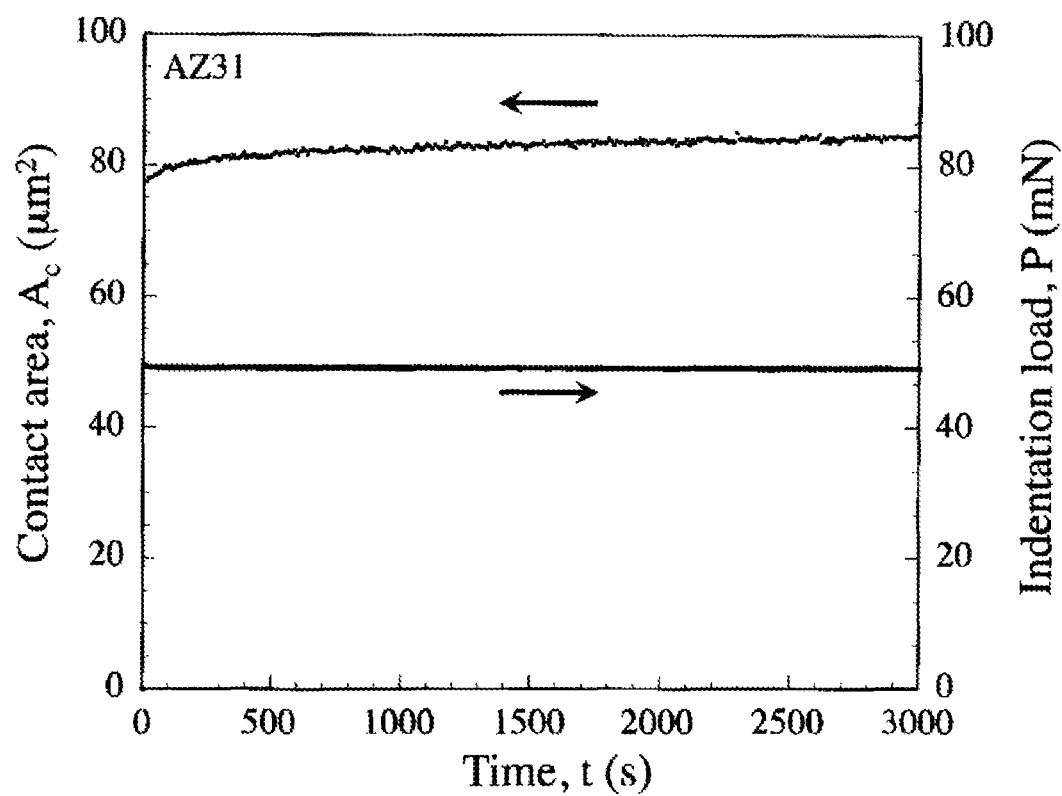
FIG. 13 is a view illustrating exemplary measurement results of an applied load (an indentation load) and a contact area during an indentation creep test of magnesium alloy (AZ31) in another Example of the present invention.

FIG. 13 illustrates actual measured values of an applied load (an indentation load) $P_0$ and a contact area $A_c$ during an indentation creep test according to the embodiment of the present invention in a case where a commercially available magnesium alloy (AZ31) is used as a specimen. The indentation creep test was carried out with respect to a plate-like test piece (10×10×1.6 mm) at room temperature (T=25.0° C.), using a diamond Berkovich indenter having a three-sided pyramidal tip and an inclined face angle β of 25.0 degrees. FIG. 13 illustrates a case where a constant applied load ($P_0$=5.000 gf=49.035 mN) is loaded for a predetermined testing time (t=3000 seconds), representing a creep curve in which the contact area $A_c$ increases over time.

Figure 14:
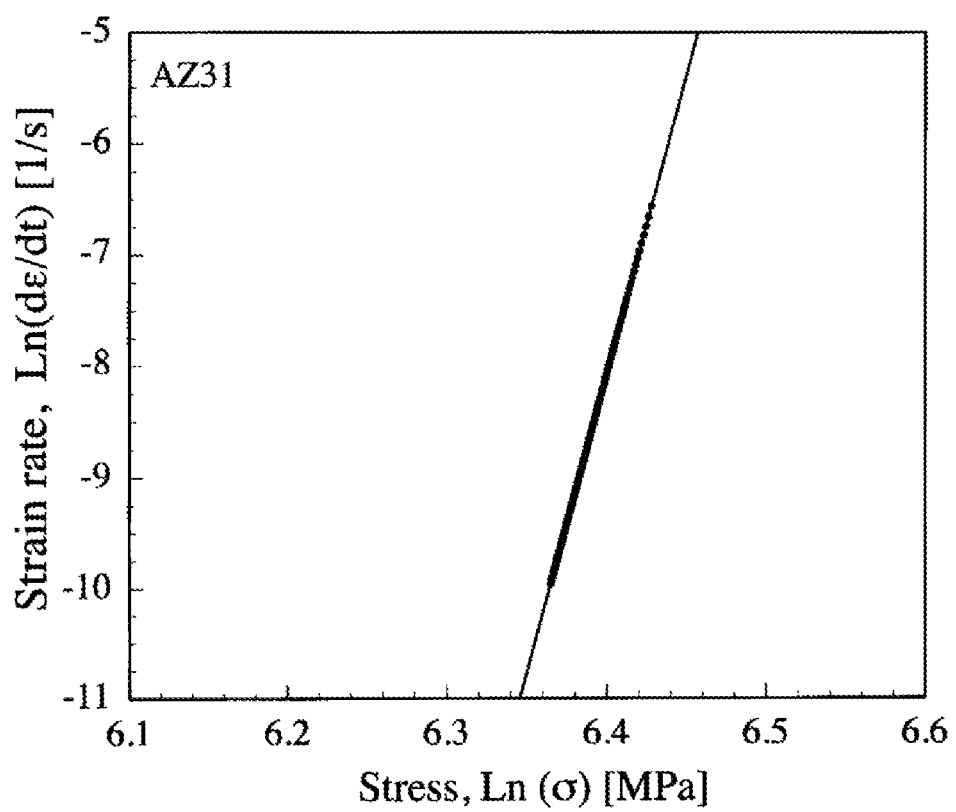
FIG. 14 is a view illustrating a plot of contact stress and a viscoelastic strain rate of magnesium alloy (AZ31) in the indentation creep test.

FIG. 14 is a graph plotting natural logarithms of viscoelastic contact stress as the X-axis, and plotting natural logarithms of the viscoelastic strain rate as the Y-axis in accordance with Formula 13, where the base is represented by e. This graph is an example in which MPa is selected as a unit of the contact stress, and $s^{-1}$ is selected as a unit of the viscoelastic strain rate. Except that a value of Young's modulus E' used herein is 48.7 GPa, the analysis in this Example is similar to the steps described in the Example using polycarbonate illustrated in FIGS. 6 to 10, so that description of the steps will be omitted.

Linear regression with respect to the linear relationship in FIG. 14 by the least squares method determines the following Formula 19.

[Mathematical Formula 19]

$$\ln\left(\frac{d\varepsilon}{dt}\right) = 54.06 \times \ln(\sigma) - 354.0 \quad (19)$$

According to Formula 19, a creep index n is determined to be 54.1, and a creep constant k is determined to be $1.76 \times 10^{-154}$.

Although it is not illustrated herein, selecting MPa as a unit of the contact stress, and selecting $h^{-1}$ as a unit of the viscoelastic strain rate determine Formula 20.

[Mathematical Formula 20]

$$\ln\left(\frac{d\varepsilon}{dt}\right) = 54.06 \times \ln(\sigma) - 345.8 \quad (20)$$

In this case, the creep index n is determined to be 54.1, and the creep constant k is determined to be $6.35 \times 10^{-151}$.

Figure 15:
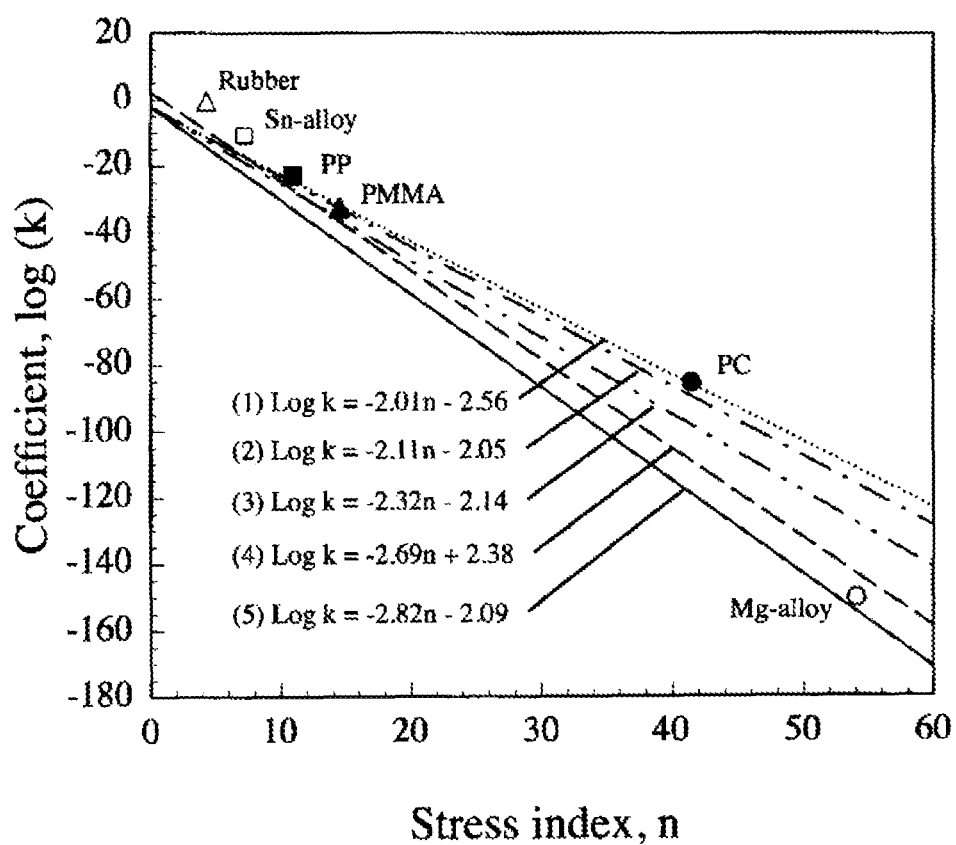
FIG. 15 is a view illustrating a creep index n and a creep constant, which are the creep physical property values determined by the present invention, being compared with various empirical formulae obtained by a conventional method.

FIG. 15 is a view illustrating the creep index n and the creep constant k, which are the creep physical property values determined by the method according to the embodiment of the present invention, being compared with results obtained by a conventional test method. FIG. 15 also illustrates test results of polypropylene (PP), tin alloy (Sn-alloy), and rubber determined by a method similar to the steps described in the Example using polycarbonate. The five straight lines illustrated in the drawing are empirical formulae obtained from creep physical property values determined by creep tests carried out by the conventional test method on various materials in wide-ranging testing temperatures (Non-Patent Literature 5). The five empirical formulae are obtained by (1) tensile creep tests on non-ferrous materials, (2) compression creep tests on various materials, (3) tensile creep tests on ceramic materials, (4) tensile creep tests on ferrous materials, and (5) tensile creep tests on various materials. It is clear that the creep physical properties of various materials determined by the method of present invention are equivalent to the empirical formulae obtained by the conventional method.

Although a preferred embodiment and Examples of the present invention have been described above, the present invention is not limited to specific embodiments or Examples and may be variously modified or changed within the gist of the present invention disclosed in the claims.

REFERENCE SIGNS LIST

1 Indentation Creep Testing Machine
2 Measurement Control Apparatus
3 Constant-Temperature Bath
4 Transparent Indenter
5 Test Piece
6 Information Processing Apparatus
7 Video Camera (Camera)
8 Positioning Device
9 Load Measurement Device
10 Input/output I/F
11 Image Analysis Unit
12 CPU
13 Condition Setting Unit
14 Physical Property Value Calculation Unit
15 Storage Device
16 Optical Microscope
17 Objective Lens
18 Precise Positioning Mechanism
19 Indenter Holding Plate
20 Observation Port
21 Contact Area
22 Contact Radius

The invention claimed is:
1. A measurement apparatus for carrying out an indentation creep test on a specimen, the measurement apparatus comprising: an indentation creep testing machine; a measurement control apparatus; and an information processing apparatus, wherein the measurement control apparatus comprises
a load measurement device configured to measure a load;
a constant-load compression device configured to compress a tip of a transparent indenter to a surface of the specimen under a load having a constant load value; and
an image capturing device configured to optically capture an image including a contact area portion which is a part of the specimen to which the load is applied by the constant-load compression device, and
the information processing apparatus comprises
an image analysis unit configured to analyze a contact area from the image including the contact area portion captured by the image capturing device; and
a physical property value calculation unit including a viscoelastic-contact-area calculation unit configured to subtract a plastic contact area to be obtained analytically from the contact area analyzed by the image analysis unit so as to calculate a viscoelastic contact area, a stress calculation unit configured to calculate contact stress based on the viscoelastic contact area calculated by the viscoelastic-contact-area calculation unit and the constant load value, and a strain rate calculation unit configured to calculate a contact strain rate based on the viscoelastic contact area, wherein the physical property value calculation unit is configured to conduct linear regression with respect to a plot of a logarithmic value of the contact stress and a logarithmic value of the contact strain rate so as to determine a creep index n and creep constant k.

2. A test method for carrying out an indentation creep test on a specimen with a measurement apparatus comprising an indentation creep testing machine, a measurement control apparatus, and an information processing apparatus, the test method comprising:
causing the measurement control apparatus to perform
a measuring step of measuring a load;
a constant load compressing step of compressing a tip of a transparent indenter to a surface of the specimen under a load having a constant load value; and
a capturing step of optically capturing an image including a contact area portion which is a part of the specimen to which the load is applied by the constant-load compression, and
causing the information processing apparatus to perform
an image analyzing step of analyzing a contact area from the image including the captured contact area portion;
a viscoelastic contact area calculating step of subtracting a plastic contact area to be obtained analytically from the contact area so as to calculate a viscoelastic contact area;
a stress calculating step of calculating contact stress based on the viscoelastic contact area and the constant load value;
a strain rate calculating step of calculating a contact strain rate based on the viscoelastic contact area; and
a step of conducting linear regression with respect to a plot of a logarithmic value of the contact stress and a logarithmic value of the contact strain rate so as to determine a creep index n and creep constant k.

3. A non-transitory computer-readable recording medium storing a physical property evaluation program that causes execution of an indentation creep test on a specimen with a measurement apparatus comprising an indentation creep testing machine, a measurement control apparatus, and an information processing apparatus, the program comprising:
causing the measurement control apparatus to perform:
a measuring step of measuring of a load;
a constant load compressing step of compressing a tip of a transparent indenter to a surface of the specimen under a load having a constant load value; and
a capturing step of optically capturing an image including a contact area portion which is a part of the specimen to which the load is applied by the constant-load compression, and
causing the information processing apparatus to perform:
an image analyzing step of analyzing a contact area from the image including the captured contact area portion;
a viscoelastic contact area calculating step of subtracting a plastic contact area to be obtained analytically from the contact area so as to calculate a viscoelastic contact area;
a stress calculating step of calculating contact stress based on the viscoelastic contact area and the constant load value;
a strain rate calculating step of calculating a contact strain rate based on the viscoelastic contact area; and
a step of conducting linear regression with respect to a plot of a logarithmic value of the contact stress and a logarithmic value of the contact strain rate so as to determine a creep index n and creep constant k.

* * * * *